United States Patent

Miner et al.

[11] Patent Number: 5,916,652
[45] Date of Patent: Jun. 29, 1999

[54] LINER FOR ADHESIVE-BACKED SHEET MATERIAL

[75] Inventors: Amos Judson Miner; Charles E. Rohrer; Linda L. Tucker, all of St. Louis County, Mo.

[73] Assignee: Data 2 Incorporated, St. Peters, Mo.

[21] Appl. No.: 08/838,858

[22] Filed: Apr. 11, 1997

[51] Int. Cl.$^6$ ...................................................... B32B 33/00
[52] U.S. Cl. ........................ 428/41.8; 283/81; 428/40.9; 428/41.1; 428/41.7; 428/457; 428/458
[58] Field of Search .................. 428/40.1, 40.9, 428/41.1, 41.7, 41.8, 457.458; 283/81

[56] References Cited

U.S. PATENT DOCUMENTS

| | | | |
|---|---|---|---|
| 3,192,100 | 6/1965 | Morgan | 428/40.9 |
| 3,716,441 | 2/1973 | Black | 428/458 |
| 4,609,589 | 9/1986 | Hosoda | 428/41.1 |

*Primary Examiner*—Nasser Ahmad
*Attorney, Agent, or Firm*—Polster, Lieder, Woodruff & Lucchesi, L.C.

[57] ABSTRACT

An adhesive-backed flexible seal, label or gasket, which is suited for use on a metal housing of an electronic component, is carried, prior to application to the housing, on a liner that dissipates static electrical charges. The liner includes a sheet of flexible liner material and a layer of dead soft aluminum bonded to the sheet and exposed on one of its surfaces.

18 Claims, 1 Drawing Sheet

LINER FOR ADHESIVE-BACKED SHEET MATERIAL

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to a liner for supporting a flexible sheet material having an adhesive backing and to the composite formed by the flexible sheet material and the liner.

One finds electronic components in a wide variety of products in today's society, and these components invariably contain tiny semiconductors, which are in effect miniature electrical circuits having closely spaced conductors. These circuits are quite sensitive to electrical energy or potentials, and indeed, a discharge of only a modest potential may damage such a circuit. The same holds true with regard to induced potentials. Likewise particles of dirt can lodge between terminals or conductors and adversely affect the operation of electronic components. The continued miniaturization and increased density of circuits have rendered them and the components in which they are installed even more vulnerable to electrical discharges and foreign particles.

Static electricity represents perhaps the most troublesome source of electrical discharges—and foreign particles as well, since an electrically charged object will attract such particles. Hence, in the clean rooms where electronic components are assembled, workers wear special clothing that is free of foreign particles and grounded so that the workers and the components on which they work remain at the same electrical potential.

Many electronic components during their assembly require installation of adhesive-backed materials which are quite thin and flexible and usually take the form of labels or seals or gaskets. The typical label may identify a component or its manufacturer or it may carry a bar code. A seal, on the other hand, usually fills or closes a gap between two sections of a housing to isolate the interior of the housing and thereby prevent contaminants from entering it and adversely affecting the circuitry and other devices within it. For example, the housing for a disk drive has two clam shell sections and an adhesive-backed seal extending around it where the two sections meet. An adhesive-backed seal may also simply cover a hole in a housing. A gasket usually fits between two segments of a housing or other device, but otherwise functions much the same as a seal. Such adhesive-backed materials, when used as seals and gaskets, further shield the electronic devices in the interiors of the housing from electromagnetic radiation which is often simply referred to as "RF".

The adhesive-backed materials come adhered to liners from which they are easily peeled for application to electronic components. The typical liner essentially consists of a paper or polymer layer and a release agent on the layer. The polymer or paper layer imparts strength and a sufficient measure of flexibility to enable the liner and sheet material to separate and thus free the sheet material for application to a housing. The release agent prevents the sheet material from adhering too firmly to the liner.

Polymers—and to a lesser measure paper—have the capacity to acquire and hold electrical charges measuring into thousands of volts, and these charges are derived merely through the effects of friction or induction or both. And the polymer layers used in conventional liners see considerable friction. Much of this friction develops in the machinery where the adhesive-backed sheet material and liners are manufactured. After all, within this machinery the sheet material and liners and that from which they are assembled are unwound from coils, passed through coating equipment, slit, and subsequently rewound into coils, all of which generates friction and the electrical charges identified with friction. To be sure, the machinery at various locations contains copper brushes or other grounding devices which contact the liner and sheet material passing through it and remove much of the charge, but not all of it. Indeed, it is not uncommon to have a liners with sheet material adhered to them leave the machinery with charges exceeding 500 volts. During subsequent shipping and handling, the composite product, that is the liner with the sheet material adhered to it, experiences more friction and induction and acquires a greater charge. When the sheet material and liner are separated a further charge develops, particularly when the separation occurs in automatic applicators which apply the sheet material to electronic components. These charges, unless dissipated, will threaten any electronic component to which the sheet material is applied or is otherwise brought into contact.

BRIEF SUMMARY OF THE INVENTION

The present invention resides in a liner for holding an adhesive-backed sheet material. The liner includes a layer of flexible liner material and a ductile metal adhered to that liner material for dissipating electrical charges. The invention also resides in a composite product that includes the liner and the flexible sheet material adhered to it. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
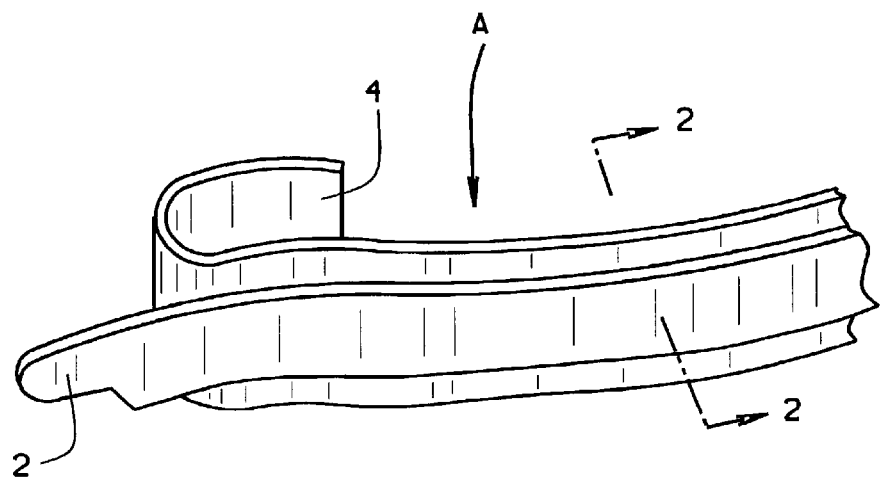
FIG. 1 is a perspective view of a composite product constructed in accordance with and embodying the present invention, with the liner of the composite being shown peeled back from the adhesive-backed sheet material of the composite.
Figure 2:
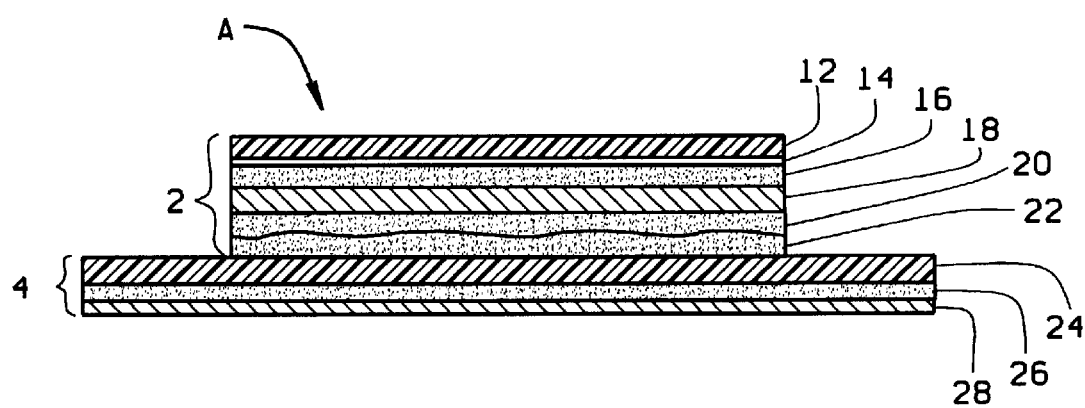
FIG. 2 is a sectional view of the composite taken along line 2—2 of FIG. 1, with the thickness of each of several layers in the composite being exaggerated for illustrative purposes.

Referring now to the drawings, a composite product A consists of a flexible sheet material 2 and a liner 4, with the sheet material 2 being adhesively bonded to the liner 4 such that the two are easily separated simply by peeling the liner 4 away from the sheet material 2. The adhesive exists on and remains with the sheet material 2, so that as the liner 4 peels away from the sheet material 2, the sheet material 2 may be applied to an electronic component. Usually the electronic component takes the form of a metal housing having sections that are separated by a gap. Contaminants, such as dust particles, gases and silicones, may enter the housing if the gap remains exposed and open. The sheet material 2 bridges the gap and adheres to the housing on both sides of it. In this instance the sheet material serves as a seal. The sheet material 2 may also cover a hole in the housing, again to prevent the ingress of contamination, and in that instance it likewise serves as a seal. The sheet material 2 also cooperates with the housing to shield the circuits and other contents of the housing from electromagnetic radiation, and thus provides a RF shield for the gap or hole. By the same token, the sheet material 2 may serve as a gasket between two sections of a housing or other components. On the other hand, the sheet material 2 may merely convey information in the form of letters or numerals or even a bar code or it may serve as decoration, and in that instance it functions as a label.

Irrespective of the function performed by the sheet material 2, the composite A, of which the sheet material 2 is a part, carries very little electrical charge and certainly remains at a potential well below that considered acceptable by the manufacturers of electronic components, such as disk drives. With conventional composites that electrical potential is substantial, but with the composite A it is no more than about 5 volts. Moreover, the liner 4 peels away from the sheet material 2 without generating a static electrical charge of any more than 5 volts. Both the sheet material 2 and liner 4, upon separation, remain at electrical potentials well below those considered dangerous by the manufacturers of electronic components. As a consequence, neither attracts foreign particles and neither exhibits any tendency to cling to objects, such as the clothing or hands of the individual who applies the sheet material 2 to the housing of an electronic component.

The flexible sheet material 2 of the composite A in its preferred form includes a clear polymer film 12 which may range in thickness between 0.5 and 2.0 mils, but is preferably 1 mil thick. The film 12 has a matte finish on at least one of its surfaces and preferably both of its surfaces and has a good measure of flexibility. One of the surfaces is exposed to form the front surface of the composite A. Polyester is the preferred polymer for the film 12, and 8025 polyester film sold by the 3M Company is suitable.

The polymer film 12 on one of its matte surfaces has a coating 14 of ink. Preferably the ink coating 14 has a thickness no greater than 0.1 mil and is gray. It may—and usually does—form letters or characters, either in reverse or positive form, so as to convey information, but may be applied so as to simply provide decoration or to impart a desired hue to the sheet material 2.

Over the ink coating 14 and the polyester film 12 to which the coating 14 is applied, is an adhesive film 16. The film 16 is between 0.8 and 2.2 mils thick and preferably is 1 mil thick. The adhesive film 16 is available as a transfer adhesive and as such must be removed from a liner as it is applied to polymer film 12 along the ink coating 14 over that film 12. 9457 acrylic adhesive, which is sold by the 3M Company, is suited for the adhesive film 16.

The adhesive film 16 bonds a layer 18 of metal to the polymer film 12, and the metal of that layer 18 should have high ductility to provide it with good dead fold characteristics. Thus, when folded, it will exhibit very little tendency to spring back to its original configuration. Dead soft aluminum is perhaps best suited for the layer 18, and it is available as a film. The metal layer 18 ranges between 0.25 and 5.0 mils in thickness and preferably is 1.5 mils thick.

Actually, the metal layer 18 lies between two films of adhesive. Of course, the adhesive film 16 is bonded to one face of the layer 18. Adhered to the opposite face of the layer 18 is a film 20 of pressure-sensitive adhesive. Like the film 16, the film 20 is available as a transfer adhesive and as such is furnished on a liner from which it is peeled for application to the metal layer 18. The film 20 should range in thickness between 0.8 and 2.2 mils and is preferably 1 mil thick. Again, 9457 adhesive film sold by the 3M Company is suitable for the film 20.

A second film 22 of pressure-sensitive adhesive is applied to the film 20, and it too is furnished as a transfer adhesive. Thus, the film 22 comes adhered to a liner, and upon removal from the liner is applied to the film 20 that is against the metal layer 18. In thickness, the film 22 should range between 0.8 and 2.2 mils and should preferably be 1 mil.

The film 22 may have the same chemical composition as and otherwise correspond to the film 20. Thus, 9457 adhesive 1 mil thick will likewise suffice for layer 22. This adhesive bonds quite firmly to metal, such as the metal stamping one finds used in the housings of electronic components. Indeed, the film 22 of pressure-sensitive adhesive marks the interface between the sheet material 2 and the liner 4, so that the unified layer of pressure-sensitive adhesive formed by the two films 20 and 22 serves to attach the sheet material 2 to the liner 4 and also to secure the sheet material 2 to the housing of an electronic component or to some other surface, once the sheet material 2 is removed from the liner 4.

On the other hand, the adhesive of the film 22 may have lesser bonding power than the adhesive of the film 20, yet may otherwise be furnished as transfer adhesive ranging between 0.8 and 2.2 in thickness and preferably 1 mil thick. In this instance 9449 adhesive, which is sold by the 3M Company, will suffice. Having lesser bonding power in its adhesive, the adhesive film 22 does not adhere as firmly to a metal housing as would the adhesive film 20, Hence, once the sheet material 2 is applied to a metal housing, it may be easily removed and repositioned. However, with time the adhesives of the two films 20 and 22 blend or diffuse into each other to form a unified layer of pressure-sensitive adhesive, and the bond with that to which the adhesive is applied is enhanced. Heat facilitates the blending, and most electronic components generate heat or are otherwise used in the presence of heat.

The liner 4 of the composite A does indeed include conventional liner material in the form of a sheet 24 to which the layer of adhesive formed by the unified films 20 and 22 of the sheet material 2 adheres. It takes the form of a clear polymer covered with a release coating, and that coating should of course be presented toward the unified adhesive films 20 and 22. Preferably the polymer of the sheet 24 is a polyester. The sheet 24 of liner material should range in thickness between 1.5 and 3.0 mils and should preferably be 2 mils thick. It should have sufficient flexibility to enable it to be reversed upon itself in a reasonably small radius, so that one can easily peel it away from the unified adhesive films 20 and 22. Standard liner materials for use as backings for adhesive products are available from the 3M Company and from Flexcon Company of Spencer, Mass. The former's polyester liner and the latter's polypropylene liner are suited for use as the sheet 24 of liner material in the composite A.

While that face of the sheet 24 of liner material which carries the release coating is adhered to the unified films 20 and 22 of adhesive, the other face is covered with an adhesive coating 26 having a thickness no greater than 0.5 mils and preferably 0.25 mils or less. The adhesive is furnished as a liquid and applied to the sheet 24 with a roller. The adhesive of the coating 26 cures when subjected to ultraviolet radiation, and hence the liquid once applied to the liner material is exposed to ultraviolet lamps to cure it and thus render it tacky.

The adhesive coating 26 bonds a metal layer 28 to the liner material 24. The layer 28 should range in thickness between 0.25 and 1.5 mils and should preferably be 0.25 mils thick. The metal of the layer 28, like the metal of the layer 18, should possess high ductility, so that it can be folded with little tendency to return to its original shape. In short, it should have dead fold characteristics. Dead soft aluminum is suitable for this purpose. Moreover the metal of the layer 28 should be exposed and indeed forms the back surface of the composite product A.

The polymer film 12, the ink coating 14, adhesive film 16, metal layer 18 and the adhesive films 20 and 22 constitute the flexible sheet material 2. The sheet 24 of liner material, the adhesive coating 26 and the metal layer 28, on the other hand, form the liner 4. The unified adhesive layer formed by the adhesive films 20 and 22 bonds the sheet material 2 to the liner 4. While the bond formed by the unified adhesive films 20 and 22 holds the sheet material 2 securely to the liner 4, that bond is not so strong that the strip 2 cannot be easily peeled away from the liner 4. Indeed, the ease with which the strip 2 can be peeled to a large measure derives from the release coating that exists on the sheet 24 of liner material which forms part of the liner 4. However, the adhesive film 22 bonds more firmly to metal stamping, such as those used in the housings for electronic components. Thus, when the flexible sheet material 2 is peeled from the liner 4 and applied to a metal housing, the adhesive film 20 attaches quite firmly to the housing. Even so the bond is not so firm that the strip 2 cannot be removed from the housing and repositioned, and this holds particularly true when the bonding capacity of the film 22 is less than that of the film 20. The bonds between the two adhesive films 20 and 22 and between the film 22 and metal layer 18 are stronger, so upon removal of the flexible sheet material 2 from a housing for repositioning, the adhesive film 22 remains adhered to the film 20 and the film 20 remains adhered to the metal layer 18. Over time and in the presence of heat, the adhesives of the two films 20 and 22 blend, and the bond with the metal of the housing becomes firmer. The heat which promotes the blending derives from the electronic component itself or from nearby components.

This invention is intended to cover all changes and modifications of the example of the invention herein chosen for purposes of the disclosure which do not constitute departures from the spirit and scope of the invention.

What is claimed is:

1. A composite product comprising: a flexible sheet material for installation on a housing containing electronic components, the sheet material having an adhesive backing for securing it to the housing; and a liner including a sheet of flexible liner material that is formed from a polymer, the adhesive backing on the flexible sheet material being adhered to the flexible liner material such that the liner may be peeled away from the flexible sheet material to expose the adhesive on the sheet material, and a layer of ductile metal attached to the sheet of liner material and being exposed on one face of the composite product to dissipate electrical charges, so that the flexible sheet material does not carry significant electrical charges when it is peeled from the liner and applied to a housing.

2. A composite product according to claim 1 wherein the flexible sheet material includes a flexible polymer film.

3. A composite product according to claim 2 wherein the flexible sheet material also includes a layer of ductile metal attached to the polymer film; and wherein the adhesive backing adheres to the layer of ductile metal in the flexible material.

4. A composite product according to claim 3 wherein the sheet of flexible liner material in the liner has a release agent on one of its surfaces and the adhesive backing is against the release agent.

5. A composite product according to claim 3 wherein the liner includes an adhesive which bonds the layer of ductile metal to the sheet of flexible liner material.

6. A composite product according to claim 3 wherein the metal in the layers of ductile metal is dead soft aluminum.

7. A composite product according to claim 6 wherein the polymer in the flexible film of the flexible sheet material is a polyester.

8. In combination with a flexible sheet material for installation on a housing containing electronic components, the sheet material having an adhesive backing for attaching it to the housing, a liner to which the flexible sheet material adheres along its adhesive backing prior to being installed on a housing, said liner comprising: a sheet of flexible liner material, which is formed from a polymer, having a release agent on one of its surfaces, with the adhesive backing of the flexible sheet material being against and adhered to the liner material along the surface at which the release agent exists; and a layer of ductile metal bonded to the sheet of flexible liner material at the other surface of the sheet of liner material where the layer of ductile metal is exposed to dissipate electrical charges, so that the flexible sheet material does not carry significant electrical charges when it is removed from the liner and installed on a housing.

9. The combination according to claim 8 wherein the layer of ductile metal is adhesively bonded to the sheet of liner material.

10. The combination according to claim 9 wherein the sheet of liner material is between 1.0 and 3.0 mils thick.

11. The combination according to claim 10 wherein the layer of ductile metal is between 0.25 and 1.5 mils thick, and the metal of the layer is dead soft aluminum.

12. A liner for supporting an adhesive-backed flexible sheet material that is to be attached to a housing containing electronic components, said liner comprising: a sheet of liner material that is formed from a polymer; a layer of metal attached to one surface of the sheet liner material where the layer of metal is exposed to dissipate electrical charges; and a release agent on the other surface of the liner material to prevent an adhesive from bonding firmly to the liner material along that other surface the liner being free of fibers.

13. A liner according to claim 12 wherein the layer of metal is adhesively bonded to one surface of the sheet of liner material.

14. A liner according to claim 13 wherein the metal in the layer of metal is dead soft aluminum.

15. A composite product according to claim 5 wherein the sheet of flexible liner material is substantially clear and the adhesive which bonds it to the layer of ductile metal underwent a cure by subjecting it to ultraviolet radiation.

16. The combination according to claim 8 wherein the flexible liner material also includes an adhesive film which lies between the layer of ductile metal and the flexible sheet material and adhesively bonds to both; and wherein the adhesive of the adhesive film underwent a cure with ultraviolet radiation.

17. The combination according to claim 16 wherein the polymer of the flexible liner material is substantially clear.

18. A liner according to claim 12 and further comprising a film of adhesive located between and adhered to the sheet of liner material and the layer of metal to attach the sheet of liner material to the layer of metal, the adhesive having been cured with ultraviolet radiation; and wherein the sheet of liner material is substantially clear.

* * * * *